United States Patent
Lacher et al.

(10) Patent No.: US 12,318,905 B2
(45) Date of Patent: Jun. 3, 2025

(54) APPARATUS AND SYSTEM FOR SUPPLYING A POWER TOOL WITH ELECTRICAL ENERGY, AND USE OF THE APPARATUS FOR THIS PURPOSE

(71) Applicant: Hilti Aktiengesellschaft, Schaan (LI)

(72) Inventors: Michael Lacher, Schwabmuenchen (DE); Stefan Ringler, Schwabmuehlhausen (DE); Christian Sattler, Biessenhofen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/273,792

(22) PCT Filed: Nov. 23, 2021

(86) PCT No.: PCT/EP2021/082650
§ 371 (c)(1),
(2) Date: Jul. 24, 2023

(87) PCT Pub. No.: WO2022/179721
PCT Pub. Date: Sep. 1, 2022

(65) Prior Publication Data
US 2024/0316744 A1    Sep. 26, 2024

(30) Foreign Application Priority Data
Feb. 26, 2021  (EP) ..................... 21159607

(51) Int. Cl.
*B25F 5/00*     (2006.01)
*H02M 1/00*    (2007.01)

(52) U.S. Cl.
CPC ............... *B25F 5/00* (2013.01); *H02M 1/007* (2021.05)

(58) Field of Classification Search
CPC ......... B25F 5/00; H02M 1/007; H02J 7/0068; H02J 7/007194; H02J 7/0042
See application file for complete search history.

(56) References Cited

U.S. PATENT DOCUMENTS

| | | | |
|---|---|---|---|
| 6,104,162 A * | 8/2000 | Sainsbury ............ | H02J 7/0069 320/111 |
| 7,049,546 B2 * | 5/2006 | Thommes ............ | H02M 5/458 219/130.21 |

(Continued)

FOREIGN PATENT DOCUMENTS

| EP | 3719984 A1 | 10/2020 |
|---|---|---|
| WO | WO 2020026665 A1 | 2/2020 |

OTHER PUBLICATIONS

International Search Report of PCT/EP2021/082650 dated Mar. 3, 2022.

*Primary Examiner* — Nathaniel C Chukwurah
(74) *Attorney, Agent, or Firm* — Davidson Kappel LLC

(57) ABSTRACT

An apparatus for supplying a power tool with electrical energy is provided. The apparatus can be used, for example, to connect the power tool to an energy network so that it can perform the function of a mains adapter. The apparatus includes a first component for converting an AC voltage into a DC voltage, as well as a second component which is configured to convert the DC voltage generated by the first component into a device DC voltage. In a second aspect, the invention relates to a system which includes a apparatus and a power tool, wherein the power tool can be supplied with electrical energy using the apparatus. A use of the apparatus for supplying a power tool with electrical energy. Advantageously, particularly high power densities can be achieved with the invention and powers of more than 1700 watts can be provided.

24 Claims, 2 Drawing Sheets

(56) References Cited

U.S. PATENT DOCUMENTS

| | | | | |
|---|---|---|---|---|
| 10,182,816 | B2* | 1/2019 | Shelton, IV | A61B 17/1155 |
| 2004/0232892 | A1* | 11/2004 | Aradachi | H02J 7/0068 |
| | | | | 320/150 |
| 2007/0090796 | A1* | 4/2007 | Norris | H02J 7/0045 |
| | | | | 320/114 |
| 2011/0121782 | A1* | 5/2011 | Marsh | H02J 7/02 |
| | | | | 320/114 |
| 2017/0069884 | A1* | 3/2017 | Beddow | B25F 5/00 |
| 2018/0004186 | A1* | 1/2018 | Tanaka | B23Q 5/58 |
| 2018/0323641 | A1* | 11/2018 | Lee | H02J 7/0013 |
| 2022/0216799 | A1 | 7/2022 | Yoshinari et al. | |

* cited by examiner

APPARATUS AND SYSTEM FOR SUPPLYING A POWER TOOL WITH ELECTRICAL ENERGY, AND USE OF THE APPARATUS FOR THIS PURPOSE

The present invention relates to an apparatus for supplying a power tool with electrical energy. The apparatus can be used, for example, to connect the power tool to an energy network so that it can perform the function of a mains adapter. In a second aspect, the invention relates to a system which comprises a apparatus and a power tool, wherein the power tool can be supplied with electrical energy using the apparatus. The invention also relates to a use of the apparatus for supplying a power tool with electrical energy.

BACKGROUND OF THE INVENTION

Power tools such as hammer drills, angle grinders, core drilling machines or the like are usually supplied with electrical energy via a mains cable. In this way, the requirements for a high and continuous energy consumption can be taken into account, so that a user of the power tool can work with the device with as little interruption as possible. However, a trend toward supplying power tools with electrical energy using batteries or rechargeable batteries can be observed in recent years. In other words, power tools that are operated by rechargeable batteries or batteries are brought onto the market by the manufacturers. Users expect to be able to dispense with wiring the device or connecting the device to the mains using a mains cable. However, this can affect the possible available working time of the power tool, especially when there are no replacement batteries or rechargeable batteries on the construction site or when there is no possibility of charging the batteries or rechargeable batteries used in order to continue using them.

SUMMARY OF THE INVENTION

In particular, the use and operation of powerful electrical power tools is limited in terms of time due to the batteries available and their power. For applications with a high power requirement, such as the performance of core drillings with a large diameter or for series applications, the required power cannot be covered in an economically viable manner by using a plurality of batteries or charging intervals.

In order to remedy this situation, mains adapters which can be used to provide an alternative energy supply for battery-operated or rechargeable-battery-operated power tools are known in the prior art. However, conventional mains adapters, as are known from the prior art, are limited to a power of less than 1200 watts due to the installation space available, the weight or the cost requirements. Solutions that are independent of installation space are often associated with the disadvantage that the corresponding connecting cables have an undesirably large strand cross section of greater than 4 mm$^2$. In addition, an additional housing in the area of the power tool can make it more difficult to handle.

An object on which the present invention is based is to overcome the above-described deficiencies and disadvantages of the prior art and to provide a possible way of being able to supply a power tool with electrical energy both using batteries or rechargeable batteries and via an energy network. In particular, the intention is to provide an apparatus which can also be used to optimally supply, in particular, those power tools which have a high power requirement. Furthermore, the power tool, which is supplied with electrical energy in this way, should be particularly easy and convenient to handle.

The invention provides an apparatus for supplying a power tool with electrical energy, wherein the apparatus comprises a first component for converting an AC voltage into a DC voltage, as well as a second component which is configured to convert the DC voltage into a device DC voltage.

For the purposes of the invention, it is preferred to refer to the first component as a PFC component, since it preferably comprises a PFC (Power Factor Correction) or is configured to perform a power factor correction function.

The PFC component can be an AC/DC rectifier, the AC/DC rectifier and thus the PFC component being configured in particular to ensure a substantially sinusoidal energy consumption from the energy supply network. In addition, the AC/DC rectifier and the PFC component can be configured to increase a DC voltage (DC). For example, it can be preferred in the context of the invention that the PFC component is used to increase a DC voltage in such a way that it assumes a higher value than a peak voltage of the applied mains voltage. In other words, the PFC component of the apparatus can be used to bring a DC voltage to a voltage level which is higher than a peak value of the voltage of the energy supply network. In this case, the PFC component preferably acts like a boost converter.

The second component of the apparatus can be in the form of a DC/DC converter, in particular. In particular, it can be a DC voltage/DC voltage converter, with DC voltage in the context of the invention being referred to with the usual abbreviation DC and with AC voltage being referred to with the usual abbreviation AC. Advantageously, the apparatus in its entirety makes it possible to convert an AC voltage into a device DC voltage, so that the AC voltage (AC) available from a public energy network can be converted into a device DC voltage. As a result, the invention advantageously makes it possible for this device DC voltage to be able to be converted easily and directly by the power tool as a load. The term "device DC voltage" should be understood in the context of the invention as meaning that this is the operating voltage needed to operate the power tool. This device DC voltage is advantageously output from the apparatus to the power tool, the device DC voltage advantageously being obtained by an AC/DC conversion process by the first component and a DC/DC conversion process by the second component of the apparatus. In other words, the second component converts, in particular, that DC voltage which was previously generated by the first component, through a conversion process from the AC voltage received from the energy network, into a device DC voltage.

The invention preferably represents an apparatus for supplying electrical energy to a power tool, which apparatus can be used to connect a power tool, for example, to a preferably public energy network ("mains") in order to obtain electrical energy from this energy network. The apparatus preferably performs the function of a mains adapter which can be used to supply a power tool, which is in particular also designed to be operated by batteries or rechargeable batteries, with electrical energy. In other words, the invention can represent an alternative energy supply option for a power tool, which can preferably be used when an energy supply with a battery or a rechargeable battery is not an option. This can be the case, for example, when the batteries or rechargeable batteries carried along are empty or are not available for energy supply for other reasons. The invention can provide, in particular, an AC/DC mains adapter for a power tool, which mains adapter can be used to supply the power tool with electrical energy, for example via a public energy network, the apparatus being configured in particular to convert the AC voltage provided by the energy network into a device DC voltage which is needed to operate the power tool. It is particularly preferred in the context of the invention that the apparatus is configured to connect the power tool to an energy network. Mains plugs and mains cables can be used for this.

It is preferred in the context of the invention that the apparatus can be connected to the power tool, the apparatus not being part of the power tool. In addition, the apparatus can be connected to a preferably public energy network. For this purpose, the apparatus can comprise a corresponding mains plug that can be plugged into a socket, for example. Furthermore, the apparatus can comprise a mains cable for connecting the mains plug to the components of the apparatus. This mains cable can be used to transport electrical energy, in particular a current, from the mains plug to the components of the apparatus. In the context of the invention, it is also preferred that the energy for operating the power tool is obtained from a generator.

It is very particularly preferred in the context of the invention that the apparatus is configured to deliver a power of greater than 1200 W. In the context of the invention, it is particularly preferred to deliver a power of greater than 1400 W, greater than 1500 W or greater than 1600 W. It is most preferred that the apparatus delivers a power of greater than 1700 W. In this way, the apparatus can also be used to supply even those power tools with electrical energy which previously could not be operated with a mains adapter, since the power that can be provided by conventional mains adapters is not sufficient for the operation of individual power tools.

In the context of the invention, it is preferred that the components of the apparatus are selected such that the adapter can provide a power of greater than 1700 W. In particular, sufficient installation space or volume is provided in the interior of the apparatus in order to arrange the individual components and elements of the power electronics in such a way that the heat loss occurring during operation of the adapter can be optimally dissipated. It is preferred in the context of the invention that the arrangement of the elements is selected such that the apparatus can have a higher degree of efficiency than comparable apparatuses known from the prior art.

It is preferred in the context of the invention that the apparatus is able to provide the output power of greater than 1700 W in a substantially constant manner. It is therefore not a single peak power which is achieved under very specific circumstances, but rather the regular output power of the apparatus.

As a particular advantage, continuous operation of a usually battery-operated or rechargeable-battery-operated electrical power tool can be made possible with the invention, in particular for those power tools which have an input power requirement of more than 1500 watts. In particular, a high level of user comfort can be provided by the high power density of the apparatus.

It is preferred in the context of the invention that the second component is configured to disconnect the power tool from a potential of the energy network. In the context of the invention, this disconnection is preferably referred to as DC isolation. It is therefore preferred in the context of the invention that the power tool is DC-isolated from a potential of the energy network ("mains potential") using the second component, with the result that the apparatus can be operated in conjunction with a battery-operated or rechargeable-battery-operated power tool.

It is preferred in the context of the invention that the first component outputs a DC voltage in a range from 300 to 500 V, preferably in a range from 350 to 450 V, particularly preferably from 380 to 420 V and most preferably of approximately 400 V. A DC voltage of this level can be received particularly well by the second component of the apparatus and converted into a device DC voltage.

In addition, it is preferred in the context of the invention that the first component is controlled by DCM and/or CRM. In the Discontinuous Current Mode (DCM) of the first component, it is preferred in the context of the invention that the current returns to zero once within each switching cycle. When the first component is operated in the Critical Conduction Mode (CRM), the converter is preferably operated at the limit of intermittent operation. As a result, there are no or fewer problems with recovery effects in the diode or the switching transistor. In addition, the first component can alternatively also be operated in a Continuous Current Mode (CCM), in which the current does not return to zero within the switching cycle and a carrier frequency of the switching transistor is kept constant. It is particularly preferred in the context of the present invention to operate the first component in the CC mode.

It is preferred in the context of the invention that the apparatus, in particular the second component, outputs a device DC voltage in a range from 20 to 30 V, preferably in a range from 22 to 28 V, particularly preferably from 24 to 26 V and most preferably from 25 to 25.5 V. Most preferred is an output voltage of the apparatus of 25.2 V. Tests have shown that this voltage is particularly well suited if the apparatus is used to replace a battery or a rechargeable battery for supplying energy to a power tool.

In a first preferred configuration of the invention, the first component can be arranged in a mains cable. In this configuration of the invention, it is preferred that the mains cable is configured to connect the first component to a socket or the preferably public energy network via a mains plug. A significant advantage of this configuration of the invention is that small strand cross sections of, for example, less than 2.5 mm$^2$ can be used for the connection cables, with the result that the apparatus can have a compact design and is easy and convenient to handle. The connection cables can, for example, connect the PFC component to the mains plug and can connect the PFC component to the second component.

It is preferred in the context of the invention that the apparatus can be connected to the power tool via the existing battery or rechargeable battery interface of the power tool. This advantageously ensures that the apparatus can be used universally. The connection can be implemented either through the intermediary of a plug connection or through a housing in which the components of the apparatus are present or can be installed. In the first configuration of the invention, it is preferred that the second component can be connected to the power tool. The second component can preferably be connected to the power tool via a detachable plug connection. It is preferred in the context of the invention that a connection is established between the components of the apparatus via terminal points.

In an alternative, second configuration of the invention, the apparatus can comprise a housing, the housing being configured to accommodate the first component and the second component. It is preferred in the context of the invention that the housing has dimensions that are similar to the dimensions of a battery or a rechargeable battery that can alternatively be used to supply energy to the power tool. This results in good interchangeability of the energy supply means and the user of the power tool can switch particularly easily and conveniently from battery or rechargeable battery operation of the power tool to mains adapter operation using the apparatus. In the first configuration of the invention, it is preferred that none of the components of the apparatus is arranged in a mains cable, thus facilitating the handling of the apparatus for the user of the apparatus or the power tool. In addition, performance can be improved by directly coupling the mains inlet to the power tool. In this way, the behavior of the power tool can advantageously be adapted and the availability of the power tool can be significantly improved.

In the context of the invention, it is preferred that operating parameters of the first and/or the second component are transmitted to the apparatus. A communication connection is preferably provided in the apparatus and can be used to transmit data from the first and/or second component to the apparatus. These data can be, for example, an input voltage and/or data relating to the functional status of the components. In the context of the invention, it is very particularly preferred that, for example, the input voltage and/or the general functional status of the PFC assembly is transmitted to the adapter. This advantageously enables the adapter to adapt its output power. This adaptation is preferably carried out on the basis of the preferably real input voltage which can be transmitted, in particular, by the first component, i.e. the PFC component. In the context of the invention, it is preferred that the apparatus sets its output power on the basis of the input voltage determined at the first component.

In the context of the invention, it is also preferred that fault states of the apparatus or its components are displayed to the user or operator of the apparatus. For this purpose, the apparatus can comprise interfaces which can be in the form of machine-machine interfaces (MMI) or human-machine interfaces (HMI). The data can advantageously be visualized using the MMI or HMI interface of the adapter.

In the second configuration of the invention, it is preferred that the housing has a width in a range from 7 to 13 cm, preferably in a range from 9 to 11 cm. In addition, the housing can have a length in a range from 12 to 20 cm, preferably in a range from 14 to 17 cm. It is also preferred that the housing has a height in a range from 5 to 12 cm, preferably in a range from 7 to 10 cm. In this way, the housing can have a volume in a range from 1000 to 1700 cm$^3$, preferably in a range from 1200 to 1500 cm$^3$. This volume allows the battery or rechargeable battery interface present in the power tool for battery or rechargeable battery operation to be used to receive the apparatus and to connect the apparatus to the power tool. This enables the apparatus to be used universally and flexibly in various power tools that have a similar or identical battery or rechargeable battery interface.

In addition, it is preferred in the context of the invention that the apparatus has a mains filter. The mains filter is preferably present on the input side of the first component or the apparatus and is thus oriented in the direction of the energy network inlet. The provision of the mains filter can in particular ensure that the apparatus complies with legal requirements for electromagnetic compatibility.

In a second aspect, the invention relates to a system which comprises a apparatus and a power tool, wherein the power tool can be supplied with electrical energy using the apparatus. In the context of the invention, it is particularly preferred that the power tool is configured to be connected to the apparatus. For this purpose, the power tool can comprise a suitable battery or rechargeable battery interface which, for example, can receive the housing of the apparatus in the second configuration of the invention. Alternatively, the power tool can be configured to accommodate the second component of the apparatus in the first configuration of the invention. In particular, the apparatus in this second configuration can be connected to the power tool by means of a plug connection.

In a further aspect, the invention relates to a use of the apparatus for supplying a power tool with electrical energy. The terms, definitions and technical advantages introduced for the apparatus preferably apply analogously to the system and the use of the apparatus.

BRIEF DESCRIPTION OF THE DRAWINGS

Further advantages will become apparent from the following description of the figures. The figures, the description and the claims contain numerous features in combination. A person skilled in the art will expediently also consider the features individually and combine them to form useful further combinations.

In the figure, the same and similar components are numbered with the same reference signs. In the figures.

DETAILED DESCRIPTION

Figure 1:
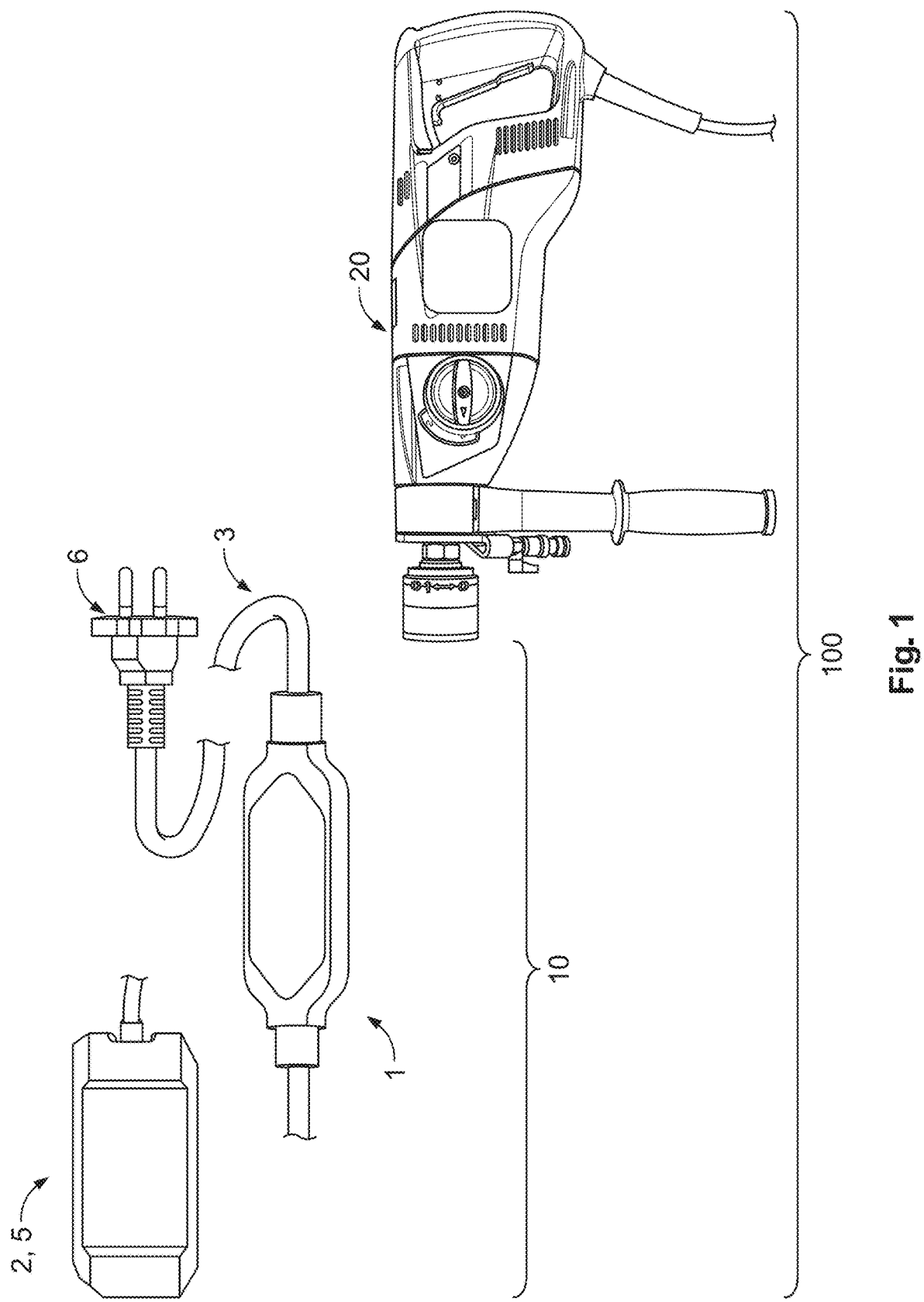
FIG. 1 shows a view of a preferred first configuration of the apparatus

FIG. 1 shows a first preferred configuration of the apparatus 10, as well as an exemplary power tool 20. The apparatus 10 makes it possible, in particular, to convert an incoming AC voltage into a DC voltage, the output DC voltage being in particular a device DC voltage that can be used to supply energy to a power tool 20. In particular, the exemplary embodiment of the invention illustrated in FIG. 1 shows the first component 1 and the second component 2 of the apparatus 10. The first component 1 is preferably a PFC component that can provide a power factor correction function. The first component 1 is used in particular to convert an AC voltage, which is obtained by the apparatus 10 via the preferably public mains or energy network, into a DC voltage. Possible input voltages of the apparatus 10 or of the first component 1 can be 110 or 230 V, for example. The second component 2 is configured to convert the DC voltage generated by the first component into a device DC voltage. The second component 2 therefore represents a DC voltage/DC voltage converter, the generated device DC voltage of which can be used to supply energy to the power tool 20. The energy can thereby be supplied, in particular, in a potential-free manner or DC-isolation can be provided. The components 1, 2 of the apparatus 10 can be connected to one another via an electrically conductive plug connection or a cable. Terminal points can also be used to connect the components 1, 2 of the apparatus 10.

In the first configuration of the invention illustrated in FIG. 1, the first component 1 of the apparatus 10 is integrated in a mains cable 3. The mains cable 3 preferably establishes the connection between the apparatus 10 or its first component 1 and an energy network or the mains. For this purpose, the mains cable 3 can have a mains plug 6 which can be plugged into a socket, for example. The apparatus 10 and the power tool 20 form a system 100 in which the apparatus 10 can be used as a mains adapter and to supply the power tool 20 with electrical energy. The advantage of this first configuration of the invention is that small strand cross sections of smaller than 2.5 mm² can be used for the mains cable 3 which connects the first component 1 to the mains plug 6, as well as for the cable which establishes the connection between the components 1, 2 of the apparatus 10.

Figure 2:
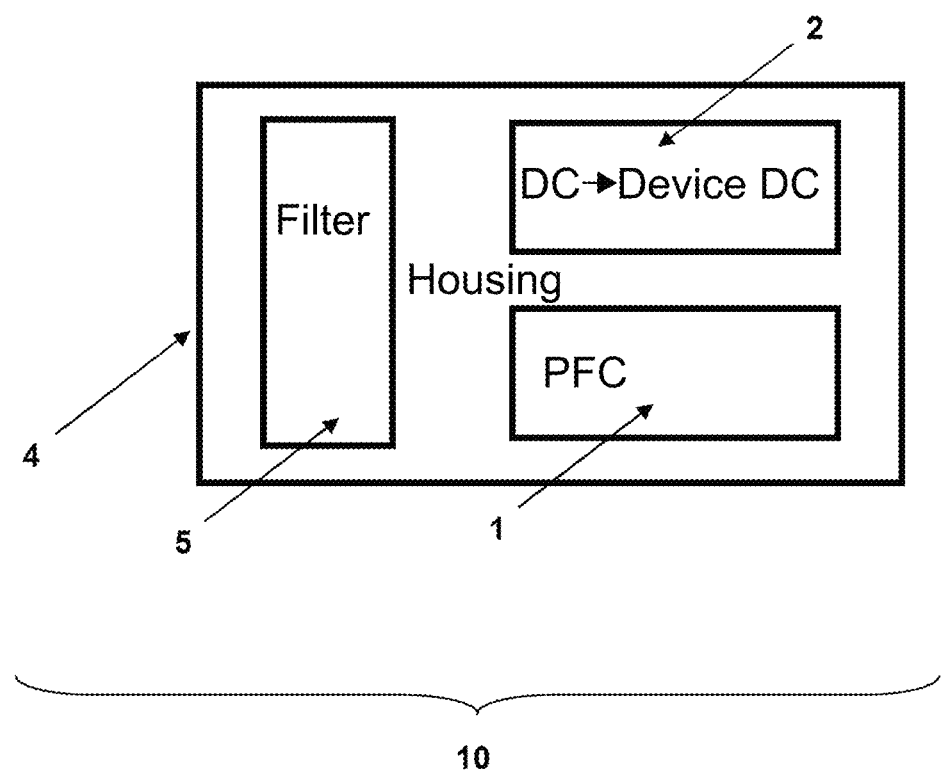
FIG. 2 shows a view of a preferred second configuration of the apparatus

FIG. 2 shows a second preferred configuration of the apparatus 10, the apparatus 10 having a housing 4 in this configuration. The components 1, 2 of the apparatus 10 can be arranged in the housing 4, wherein the components of the apparatus 10 can be arranged in this way—as illustrated by way of example in FIG. 2—or can be arranged differently inside the housing 4. The apparatus 10 can also comprise a mains filter 5 which is preferably also arranged in the housing 4 of the apparatus 10. The advantage of this configuration of the invention is that there is no component 1, 2 integrated in the mains cable 3 and that a surprisingly good performance can be achieved through the direct coupling between the mains inlet and the power tool 20. Accommodating the components 1, 2 of the apparatus 10 in a housing 4, which preferably has similar dimensions to a conventional battery or a conventional rechargeable battery, means that the battery or rechargeable battery interface already present on the power tool 20 can advantageously be used to receive or connect the apparatus 10.

In the context of the invention, it can also be preferred that only the mains filter 5 is present outside the housing 4 of the apparatus 10. In this configuration of the invention, the mains filter 5 is understood to be the cable-side housing of the apparatus 10. In other words, in this configuration of the invention, only the mains filter 5 of the apparatus 10 is present in the cable-side housing 4 of the apparatus, while the components 1, 2 of the apparatus 10 remain in the housing 4.

LIST OF REFERENCE SIGNS

1 First component
2 Second component
3 Mains cable
4 Housing
5 Mains filter
6 Mains plug
10 Apparatus
20 Power tool
100 System

What is claimed is:

1. An apparatus for supplying a power tool with electrical energy, the apparatus comprising:
a first converter for converting an AC voltage into a DC voltage; and
a second converter configured to convert the DC voltage into a device DC voltage;
wherein the housing has a volume in a range from 1000 to 1700 cm³.

2. The apparatus recited in claim 1 wherein the second converter is configured to disconnect the power tool from a potential of the energy network.

3. The apparatus recited in claim 1 wherein the first converter outputs a DC voltage in a range from 300 to 500 V.

4. The apparatus recited in claim 3 wherein the DC voltage is in a range is from 350 to 450 V, 380 to 420 V and most preferably of approximately 400 V.

5. The apparatus recited in claim 4 wherein the DC voltage is in a range is from 380 to 420 V.

6. The apparatus recited in claim 5 wherein the DC voltage is 400 V.

7. The apparatus recited in claim 1 wherein the second converter outputs a device DC voltage in a range from 20 to 30 V.

8. The apparatus recited in claim 7 wherein the second converter outputs a device DC voltage in a range from 22 to 28 V.

9. The apparatus recited in claim 8 wherein the second converter outputs a device DC voltage in a range from 24 to 26 V.

10. The apparatus recited in claim 9 wherein the second converter outputs a device DC voltage in a range from 25 to 25.5 V.

11. The apparatus recited in claim 1 wherein the apparatus is configured to deliver a power of greater than 1200 W.

12. The apparatus recited in claim 1 further comprising a mains filter.

13. The apparatus recited in claim 1 wherein the first converter is arranged in a mains cable.

14. The apparatus recited in claim 1 further comprising a mains cable having a mains plug.

15. The apparatus recited in claim 1 wherein the second converter is connectable to the power tool.

16. The apparatus recited in claim 1 further comprising a housing configured to accommodate the first converter and the second converter.

17. The apparatus as recited in claim 16 wherein the housing has a width in a range from 7 to 13 cm, the housing has a length in a range from 12 to 20 cm or the housing has a height in a range from 5 to 12 cm.

18. The apparatus as recited in claim 17 wherein the width is in a range from 9 to 11 cm, the length in a range from 14 to 17 cm, or the height in a range from 7 to 10 cm.

19. The apparatus as recited in claim 16 wherein the housing has the width in a range from 7 to 13 cm, the length in a range from 12 to 20 cm and the height in a range from 5 to 12 cm.

20. The apparatus as recited in claim 19 wherein the width is in a range from 9 to 11 cm, the length in a range from 14 to 17 cm, and the height in a range from 7 to 10 cm.

21. The apparatus as recited in claim 1 wherein the housing has a volume in a range from 1200 to 1500 cm³.

22. A system comprising the apparatus as recited in claim 1 and a power tool suppliable with electrical energy via the apparatus.

23. A method for operating the apparatus as recited in claim 1 comprising: supplying a power tool with electrical energy via the apparatus.

24. An apparatus for supplying a power tool with electrical energy, the apparatus comprising:
a first converter for converting an AC voltage into a DC voltage; and
a second converter configured to convert the DC voltage into a device DC voltage; and
a housing configured to accommodate the first converter and the second converter;
the apparatus configured to deliver a power of greater than 1700 W and the housing having a width in a range from 7 to 13 cm, the housing has a length in a range from 12 to 20 cm or the housing has a height in a range from 5 to 12 cm.

* * * * *